(12) United States Patent
Sakashita et al.

(10) Patent No.: US 10,343,300 B2
(45) Date of Patent: Jul. 9, 2019

(54) METHOD AND APPARATUS FOR MANUFACTURING POROUS BODY

(71) Applicant: NGK INSULATORS, LTD., Nagoya (JP)

(72) Inventors: Satoshi Sakashita, Yokkaichi (JP); Masayuki Uchida, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 105 days.

(21) Appl. No.: 15/259,417

(22) Filed: Sep. 8, 2016

(65) Prior Publication Data

US 2017/0072589 A1  Mar. 16, 2017

(30) Foreign Application Priority Data

Sep. 11, 2015  (JP) .................................. 2015-179727

(51) Int. Cl.
*B33Y 10/00* (2015.01)
*B28B 1/00* (2006.01)
(Continued)

(52) U.S. Cl.
CPC .......... *B28B 1/001* (2013.01); *B01D 46/2418* (2013.01); *B33Y 10/00* (2014.12); *B33Y 30/00* (2014.12); *B33Y 50/02* (2014.12); *B33Y 70/00* (2014.12); *B33Y 80/00* (2014.12); *F01N 3/0222* (2013.01); *F01N 3/2828* (2013.01); *F01N 2330/06* (2013.01)

(58) Field of Classification Search
CPC ......... B28B 1/001; B33Y 10/00; B33Y 70/00; B33Y 80/00
See application file for complete search history.

(56) References Cited

U.S. PATENT DOCUMENTS 5,278,442 A * 1/1994 Prinz ....................... B22F 3/115
                                                    257/417
6,143,293 A * 11/2000 Weiss ........................ A61L 27/18
                                                    424/423
(Continued)

FOREIGN PATENT DOCUMENTS

DE              19809657 B4    3/2006
DE     10 2014 212 234 A1     12/2014
(Continued)

OTHER PUBLICATIONS

German Office Action (With English Translation), German Application No. 10 2016 010 918.1, dated Sep. 20, 2017 (8 pages).
(Continued)

*Primary Examiner* — Nathan H Empie
(74) *Attorney, Agent, or Firm* — Burr & Brown, PLLC

(57) ABSTRACT

A method for manufacturing a porous body includes a structure forming step that is repeatedly performed a plurality of times and includes: a pore-forming material placing step of placing a pore-forming material 50 for forming pores in the porous body; an aggregate placing step of placing aggregate particles 51 which are part of raw materials of the porous body; a binder placing step of placing binder particles 52 which are part of the raw materials of the porous body; and a binding step of heat-fusing at least part of the placed binder particles 52 to bind aggregate particles 51 together.

10 Claims, 7 Drawing Sheets

(51) Int. Cl.
*B33Y 30/00* (2015.01)
*B33Y 50/02* (2015.01)
*B33Y 70/00* (2015.01)
*B33Y 80/00* (2015.01)
*B01D 46/24* (2006.01)
*F01N 3/28* (2006.01)
*F01N 3/022* (2006.01)

(56) References Cited

U.S. PATENT DOCUMENTS

| | | | |
|---|---|---|---|
| 6,376,148 B1* | 4/2002 | Liu | B22F 3/008 |
| | | | 156/273.1 |
| 7,815,826 B2* | 10/2010 | Serdy | A61F 2/28 |
| | | | 264/122 |
| 2002/0152715 A1* | 10/2002 | Rotheroe | E04C 3/32 |
| | | | 52/855 |
| 2003/0114936 A1* | 6/2003 | Sherwood | A61F 2/28 |
| | | | 623/23.58 |
| 2004/0053101 A1* | 3/2004 | Chartier | C04B 35/495 |
| | | | 252/500 |
| 2006/0019567 A1* | 1/2006 | Sayers | D21F 1/0063 |
| | | | 442/218 |
| 2006/0045787 A1* | 3/2006 | Jandeska, Jr. | B22F 1/025 |
| | | | 419/47 |
| 2007/0158200 A1* | 7/2007 | Cohen | B81C 99/0095 |
| | | | 205/80 |
| 2010/0222209 A1 | 9/2010 | Kashani-Shirazi et al. | |
| 2011/0129924 A1* | 6/2011 | Ying | A61L 27/56 |
| | | | 435/396 |
| 2013/0307175 A1* | 11/2013 | Tang | C04B 35/64 |
| | | | 264/42 |
| 2014/0231266 A1* | 8/2014 | Sherrer | B22D 19/00 |
| | | | 205/136 |
| 2015/0328678 A1* | 11/2015 | McNulty | B22C 1/00 |
| | | | 164/529 |
| 2016/0121271 A1* | 5/2016 | Lescoche | C04B 38/0006 |
| | | | 210/500.25 |
| 2016/0151161 A1 | 6/2016 | Lorenz et al. | |

FOREIGN PATENT DOCUMENTS

| | | | | |
|---|---|---|---|---|
| EP | 2 200 736 B1 | 11/2016 | | |
| JP | H04-099203 A1 | 3/1992 | | |
| JP | 2013-141630 A1 | 7/2013 | | |
| WO | WO-2014110679 A1 * | 7/2014 | | B29C 67/02 |
| WO | WO-2015030879 A2 * | 3/2015 | | C04B 35/10 |

OTHER PUBLICATIONS

German Summons to Attend Hearing (Application No. 10 2016 010 918.1) dated Apr. 25, 2018 (with English translation).

B.Y. Stevinson, et al., "Support-Free Infiltration of Selective Laser Sintered (SLS) Silicon Carbide Preforms," *Solid Freeform Fabrication Proceedings*, 2006, pp. 359-365.

Japanese Office Action (Application No. 2015-179727) dated Apr. 2, 2019 (with English translation).

* cited by examiner

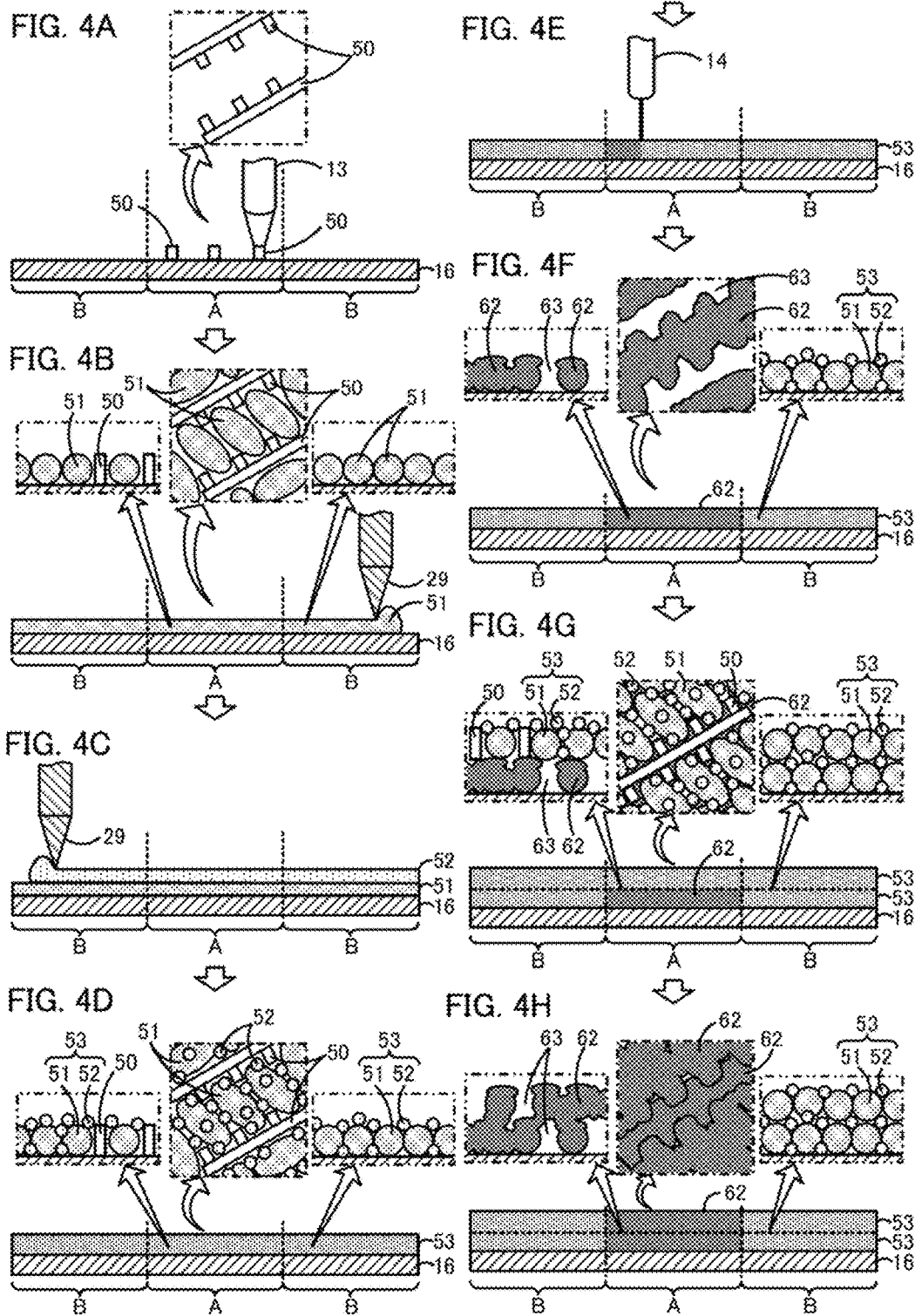

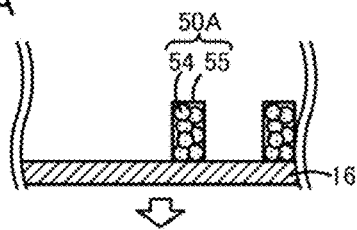
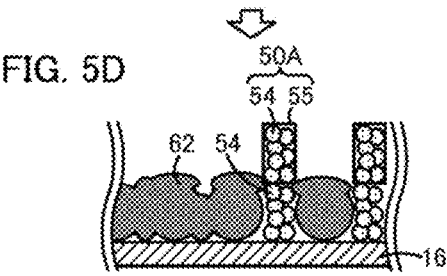
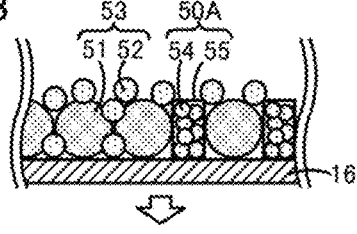
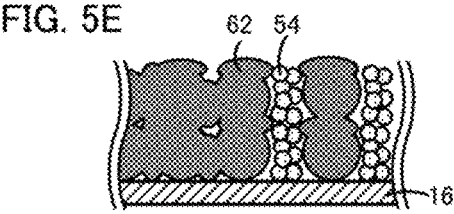
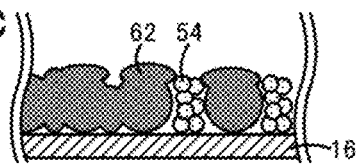
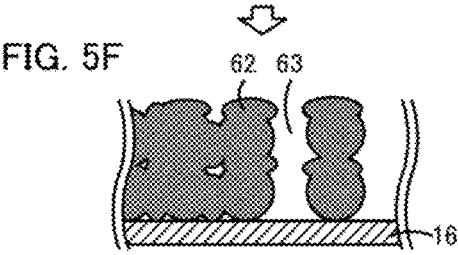
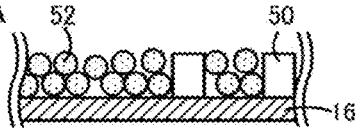
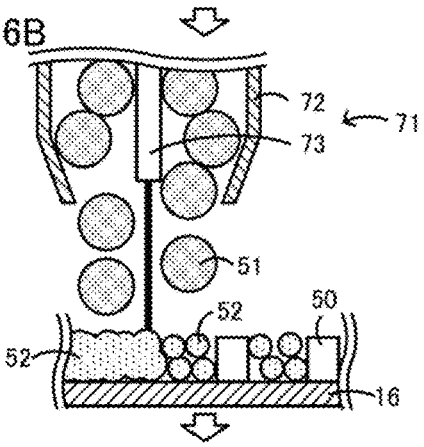
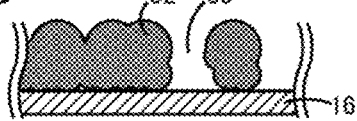

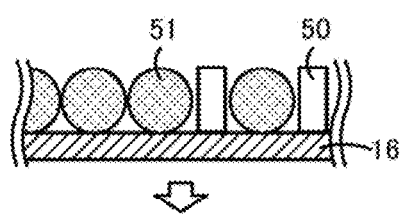
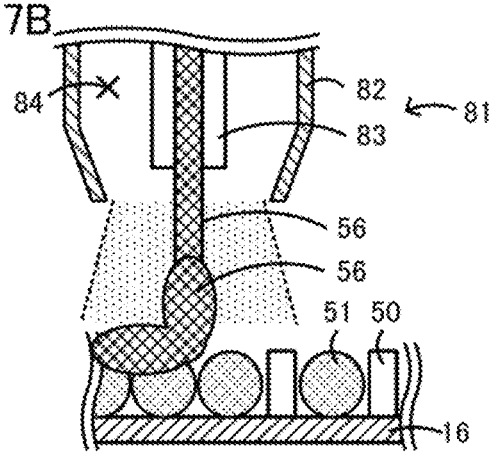
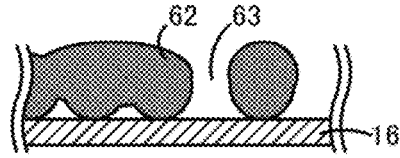

METHOD AND APPARATUS FOR MANUFACTURING POROUS BODY

BACKGROUND OF THE INVENTION

1. Field of the Invention

The present invention relates to a method and apparatus for manufacturing a porous body.

2. Description of the Related Art

Examples of previously known porous bodies include those used for cleaning exhaust gas, such as honeycomb filters. For example, PTL 1 describes a honeycomb filter manufacturing method including: mixing raw materials such as SiC powder and metallic Si powder to obtain clay, subjecting the clay to extrusion molding using a die to obtain a compact, and then firing the compact.

CITATION LIST

Patent Literature

[PTL 1] Japanese Unexamined Patent Application Publication No. 2013-141630

SUMMARY OF THE INVENTION

However, in the manufacturing method described in PTL 1, the die corresponding to the shape of the compact is required, and this presents a problem in that cost and labor for producing the die are required.

The present invention has been made to solve the above problem, and it is a principal object to provide a porous body manufacturing method and apparatus that do not require a die for extrusion molding.

The present invention employs the following means to achieve the above-described principal object.

A method for manufacturing a porous body comprises a structure forming step repeatedly performed a plurality of times and including: a pore-forming material placing step of placing a pore-forming material for forming pores in the porous body; an aggregate placing step of placing aggregate particles which are part of raw materials of the porous body; a binder placing step of placing a binder which is part of the raw materials of the porous body; and a binding step of heat-fusing at least part of the binder to thereby bind the aggregate particles together.

An apparatus for manufacturing a porous body according to the present invention comprises
a pore-forming material placing unit for placing a pore-forming material for forming pores in the porous body;
an aggregate placing unit for placing aggregate particles which are part of raw materials of the porous body;
a binder placing unit for placing a binder which is part of the raw materials of the porous body;
a binding unit for heat-fusing at least part of the binder to thereby bind the aggregate particles together; and
a controller for repeatedly performing placing the pore-forming material, placing the aggregate particles, placing the binder, and binding the aggregate particles together a plurality of times.

With the porous body manufacturing method and apparatus of the present invention, the porous body is manufactured by repeatedly performing placing the pore-forming material, placing the aggregate particles, placing the binder, and binding the aggregate particles together a plurality of times. This can eliminate the need for a die for extrusion molding.

BRIEF DESCRIPTION OF THE DRAWINGS

FIGS. 4A-4H show illustrations of the procedure for manufacturing a bound body 62 that is part of the partition walls 42 of the honeycomb structure 41.

FIGS. 5A-5F show illustrations of the procedure in the structure forming step in a modification.

FIGS. 6A-6C show illustrations of the procedure in the structure forming step in a modification.

FIGS. 7A-7C show illustrations of the procedure in the structure forming step in a modification.

DETAILED DESCRIPTION OF THE INVENTION

Figure 1:
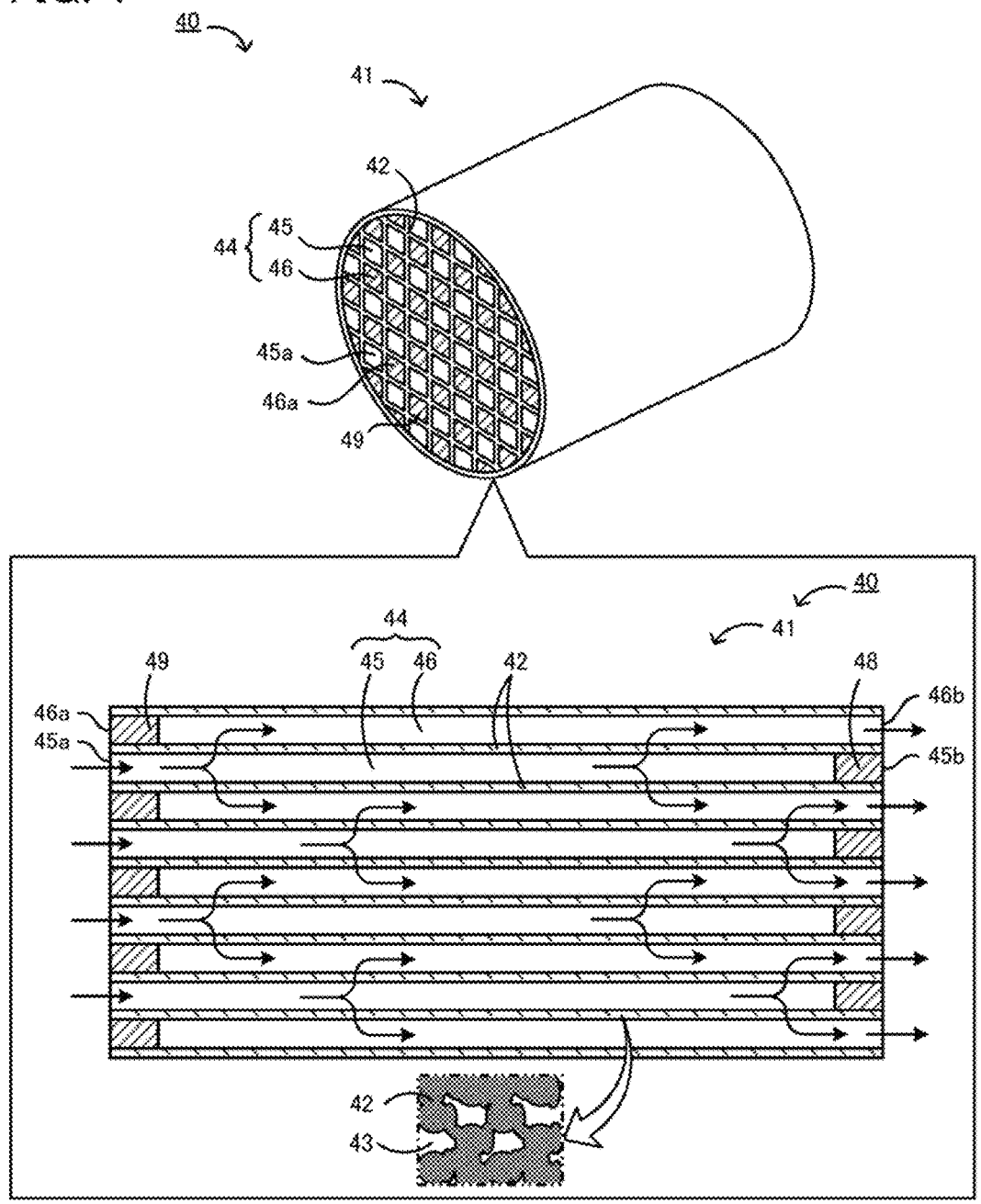
FIG. 1 shows an illustration of a honeycomb filter 40 including a honeycomb structure 41.
Figure 2:
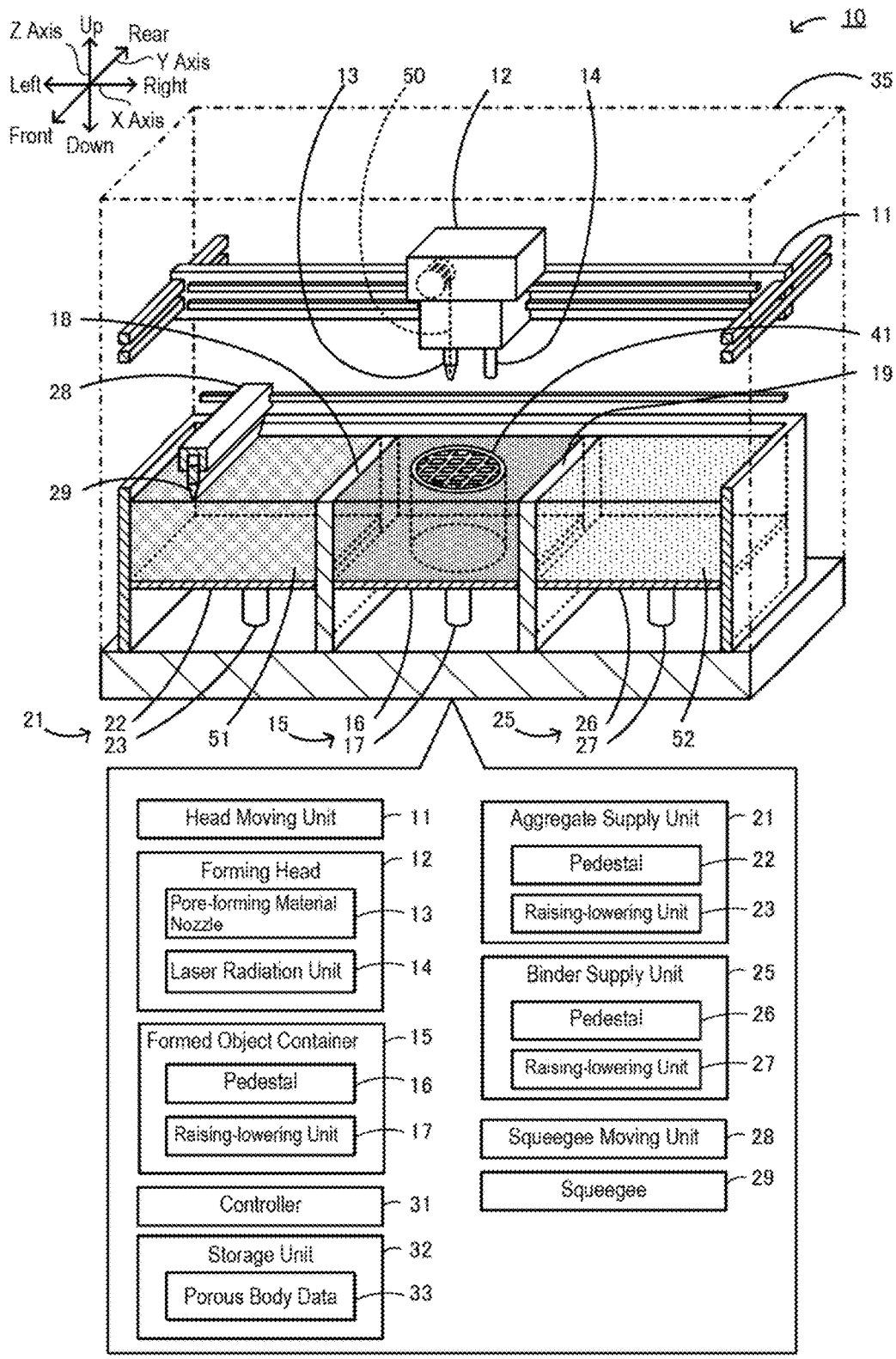
FIG. 2 is an illustration of a three-dimensional forming apparatus 10.

Embodiments of the present invention will next be described with reference to the drawings. FIG. 1 shows an illustration of a honeycomb filter 40 including a honeycomb structure 41 manufactured by the porous body manufacturing method of the present invention. The upper section of FIG. 1 shows a perspective view, and the lower section shows a cross-sectional view. FIG. 2 is an illustration of a three-dimensional forming apparatus 10 which is an embodiment of the porous body manufacturing apparatus of the present invention. In the present embodiment, upward and downward directions, left and right directions, and forward and rearward directions are as shown in FIG. 2.

First, the honeycomb filter 40 in FIG. 1 will be described. The honeycomb filter 40 is a diesel particulate filter (DPF) having the function of filtering particulate matter (PM) in exhaust gas from a diesel engine. The honeycomb filter 40 includes the honeycomb structure 41, an outlet sealing material 48, and an inlet sealing material 49. The honeycomb structure 41 includes porous partition walls 42 having internal pores 43 (see an enlarged illustration in the lower section of FIG. 1). The honeycomb structure 41 includes a large number of cells 44 separated by the partition walls 42. The large number of cells 44 include: open inlet cells 45 each having an open inlet 45a and an outlet 45b sealed with the outlet sealing material 48; and open outlet cells 46 each having an inlet 46a sealed with the inlet sealing material 49 and an open outlet 46b. These open inlet cells 45 and open outlet cells 46 are arranged alternately so as to be adjacent to each other. In the present embodiment, the honeycomb structure 41 has a cylindrical external shape, but the external shape is not particularly limited thereto. The honeycomb structure 41 may have a quadrangular prism shape, an elliptic cylindrical shape, a hexagonal prism shape, etc. Each of the cells 44 has a quadrangular prism shape having a quadrangular cross section, but the shape of the cells 44 is not particularly limited thereto. The cells 44 may have a polygonal shape such as a triangular prism shape, a hexagonal prism shape, or an octagonal prism shape, a shape such as a cylindrical shape or an elliptic cylindrical shape, or any combination of these shapes. The partition walls 42 contain an aggregate and a binder, and a plurality of aggregate particles are bound together through fused binder particles. In the present embodiment, silicon carbide (SiC) is used as the aggregate, and silicon (Si) is used as the binder.

The partition walls 42 are formed from Si-bonded SiC ceramic. The thickness of the partition walls 42 is, for example, 50 μm or more and less than 600 μm. The average pore diameter (the average diameter of the pores) in the partition walls 42 is, for example, 2 μm or more and less than 60 μm. The porosity of the partition walls 42 is preferably 30% by volume or more and more preferably 35% by volume or more. The porosity of the partition walls 42 is preferably 85% by volume or less and more preferably 65% by volume or less. The average pore diameter and the porosity are values measured by a mercury intrusion method. The cell density of the cells 44 is, for example, 15 cells/cm$^2$ or more and less than 65 cells/cm$^2$. In the partition walls 42, a trapping layer may be disposed on portions exposed in the cells 44 (partition wall surfaces). In the partition walls 42, a catalyst such as a noble metal may be supported on at least one of the trapping layer and the partition wall surface of each partition wall 42.

This honeycomb filter 40 is mounted, for example, on the downstream side of an unillustrated diesel engine and used to clean exhaust gas containing PM and discharge the resulting gas to the air. Arrows in the lower section of FIG. 1 show the flow of the exhaust gas in this process. The PM-containing exhaust gas from the diesel engine flows into the open inlet cells 45 of the honeycomb filter 40 through the inlets 45a, passes through the partition walls 42, flows into their adjacent open outlet cells 46, and is then discharged to the air through the open outlets 46b of the open outlet cells 46. The PM in the PM-containing exhaust gas is trapped when the exhaust gas flows from the open inlet cells 45 into the open outlet cells 46 through the partition walls 42. Therefore, the exhaust gas flowing through the open outlet cells 46 is clean gas containing no PM.

Next, the three-dimensional forming apparatus 10 in FIG. 2 will be described. The three-dimensional forming apparatus 10 is an apparatus for manufacturing the honeycomb structure 41 using an additive manufacturing process. With the three-dimensional forming apparatus 10, the honeycomb structure 41 is formed by forming one of a plurality of structural layers obtained by splitting the honeycomb structure 41 and then repeating this procedure to stack other layers one on top of another to thereby form a three-dimensional object. As shown in FIG. 2, the three-dimensional forming apparatus 10 includes a head moving unit 11, a forming head 12, a formed object container 15, an aggregate supply unit 21, a binder supply unit 25, a squeegee moving unit 28, a squeegee 29, a controller 31, a storage unit 32, and a casing 35. The casing 35 has an inner processing space for manufacturing the honeycomb structure 41, and the processing space is sealed. The casing 35 has an unillustrated door disposed, for example, so as to cover the entire area of one face. This allows, for example, the manufactured honeycomb structure 41 to be removed.

The head moving unit 11 is a mechanism for moving the forming head 12 disposed inside the casing 35 in the forward, rearward, left, and right directions (XY directions). The head moving unit 11 includes: a Y-axis slider that moves in the Y direction while guided by guide rails disposed on inner walls of the casing 35; an X-axis slider that moves in the X direction while guided by a guide rail disposed in the Y-axis slider; and motors for driving the X-axis and Y-axis sliders.

The forming head 12 is a head for performing a pore-forming material placing step and a binding step described later when the honeycomb structure 41 is manufactured. The forming head 12 is moved in the XY directions by the head moving unit 11. The forming head 12 includes a pore-forming material nozzle 13 and a laser radiation unit 14. The pore-forming material nozzle 13 is a nozzle for placing a pore-forming material 50 for forming pores of a porous body in the formed object container 15. The pore-forming material nozzle 13 includes an unillustrated heater disposed therein. The forming head 12 includes therein: a reel on which the pore-forming material 50 in wire form is wound; and an unillustrated motor for rotating the reel to thereby unwind the pore-forming material 50. The pore-forming material 50 used may be a material that is fused by heat and then cured when cooled after placement. The pore-forming material 50 used may be a vanishing material that vanishes upon heating. Specific examples of the pore-forming material 50 include thermoplastic resins such as acrylonitrile-butadiene-styrene (ABS) resins, polycarbonate resins, and polylactic acid (PLA) resins. The pore-forming material 50 unwound from the reel is heated and fused by the heater of the pore-forming material nozzle 13. This causes the pore-forming material 50 to be extruded from the lower end of the pore-forming material nozzle 13, and the pore-forming material nozzle 13 thereby places the pore-forming material 50 in the formed object container 15. The pore-forming material nozzle 13 may be vertically raised and lowered by an unillustrated raising-lowering mechanism included in the forming head 12. The laser radiation unit 14 heat-fuses at least part of binder particles 52 placed in the formed object container 15 to thereby bind together aggregate particles 51 placed in the formed object container 15. The laser radiation unit 14 includes therein a laser oscillator and an optical unit such as a lens and emits a laser beam downward from a lower end to heat-fuse the binder particles 52. Examples of the type of laser beam emitted from the laser radiation unit 14 include solid state laser beams such as Nd:YAG laser beams and gas laser beams such as $CO_2$ laser beams.

The formed object container 15 serves as a placement location for a formed object (the honeycomb structure 41) manufactured by the three-dimensional forming apparatus 10. The formed object container 15 is disposed inside the casing 35 and located below the head moving unit 11 and the forming head 12. The formed object container 15 includes: front, rear, left, and right wall sections including left and right walls 18 and 19; a pedestal 16 on which the honeycomb structure 41 is to be placed; and a raising-lowering unit 17 for vertically raising and lowering the pedestal 16. The honeycomb structure 41 is to be formed within a space surrounded by the wall sections and the pedestal 16 and having an upper opening.

The aggregate supply unit 21 is a mechanism for supplying the aggregate particles 51, which are part of raw materials of the honeycomb structure 41. The aggregate supply unit 21 is disposed inside the casing 35 and located to the left of the formed object container 15. The aggregate supply unit 21 includes: front, rear, left, and right wall sections including the wall 18; a pedestal 22 on which the aggregate particles 51 are placed; and a raising-lowering unit 23 for vertically raising and lowering the pedestal 22. In the aggregate supply unit 21, a space surrounded by the wall sections and the pedestal 22 and having an upper opening is filled with the aggregate particles 51. When the pedestal 22 is raised, the aggregate particles 51 are lifted and supplied upward beyond the upper surface of the wall 18. In this state, the squeegee 29 can move the supplied aggregate particles 51 to the left and right.

The binder supply unit 25 is a mechanism for supplying the binder particles 52, which are part of the raw materials of the honeycomb structure 41. The binder supply unit 25 has the same structure as that of the aggregate supply unit 21 except that the binder supply unit 25 is located to the right of the formed object container 15. The binder supply unit 25 is disposed inside the casing 35 and includes: front, rear, left, and right wall sections including the wall 19; a pedestal 26 on which the binder particles 52 are placed; and a raising-lowering unit 27 for vertically raising and lowering the pedestal 26. In the binder supply unit 25, a space surrounded by the wall sections and the pedestal 26 and having an upper opening is filled with the binder particles 52. When the pedestal 26 is raised, the binder particles 52 are lifted and supplied upward beyond the upper surface of the wall 19. In this state, the squeegee 29 can move the supplied binder particles 52 to the left and right.

The squeegee moving unit 28 is a mechanism for moving the squeegee 29 disposed inside the casing 35 in the upward, downward, left, and right directions (XZ directions). The squeegee moving unit 28 includes: a X-axis slider that moves in the X direction while guided by a guide rail disposed on an inner wall surface of the casing 35; a motor for driving the X-axis slider; and a raising-lowering mechanism for vertically raising and lowering the squeegee 29.

The squeegee 29 is a member for moving the aggregate particles 51 supplied from the aggregate supply unit 21 and the binder particles 52 supplied from the binder supply unit 25 to the left and right. The squeegee 29 has, on its left and right sides, vertically inclined rectangular flat surfaces with their lengthwise direction along the forward-rearward direction. The squeegee moving unit 28 moves the squeegee 29 to the left and right with the lower end of the squeegee 29 positioned at the level at which the lower end comes into contact with the upper surfaces of the walls 18 and 19. Therefore, one of the flat surfaces of the squeegee 29 that is on a moving direction side pushes and moves an object (the aggregate particles 51 or the binder particles 52) supplied upward beyond the upper surfaces of the walls 18 and 19 to thereby guide the object to the space inside the formed object container 15.

The controller 31 controls the entire apparatus and is configured, for example, as a microprocessor including a CPU as a main component. The controller 31 outputs control signals to the head moving unit 11, the forming head 12, the raising-lowering units 17, 23, and 27, the squeegee moving unit 28, etc. to repeatedly perform placing the pore-forming material 50, the aggregate particles 51, and the binder particles 52 and then binding the aggregate particles 51 together a plurality of times.

The storage unit 32 stores data and programs for controlling the apparatus. The storage unit 32 stores porous body data 33, a three-dimensional forming processing program, etc. The porous body data 33 is data including the pore structure of the honeycomb structure 41 (e.g., structural data relating to the positions, dimensions, etc. of the pores 43 in the partition walls 42), the structure of the partition walls (e.g., structural data relating to the thickness of the partition walls 42, the dimensions of the cells 44, the positional relation among the plurality of cells 44, etc.), etc. The porous body data 33 may be, for example, voxel data including information about a plurality of voxels with their positions represented by XYZ coordinates and information indicating whether each voxel is in a partition wall 42, a pore 43, or a cell 44. The porous body data 33 may be data obtained by subjecting an actual honeycomb structure 41 to CT scanning, data obtained by processing the above-obtained data, or data empirically determined by structural analysis or an experiment such as a simulation.

Figure 3:
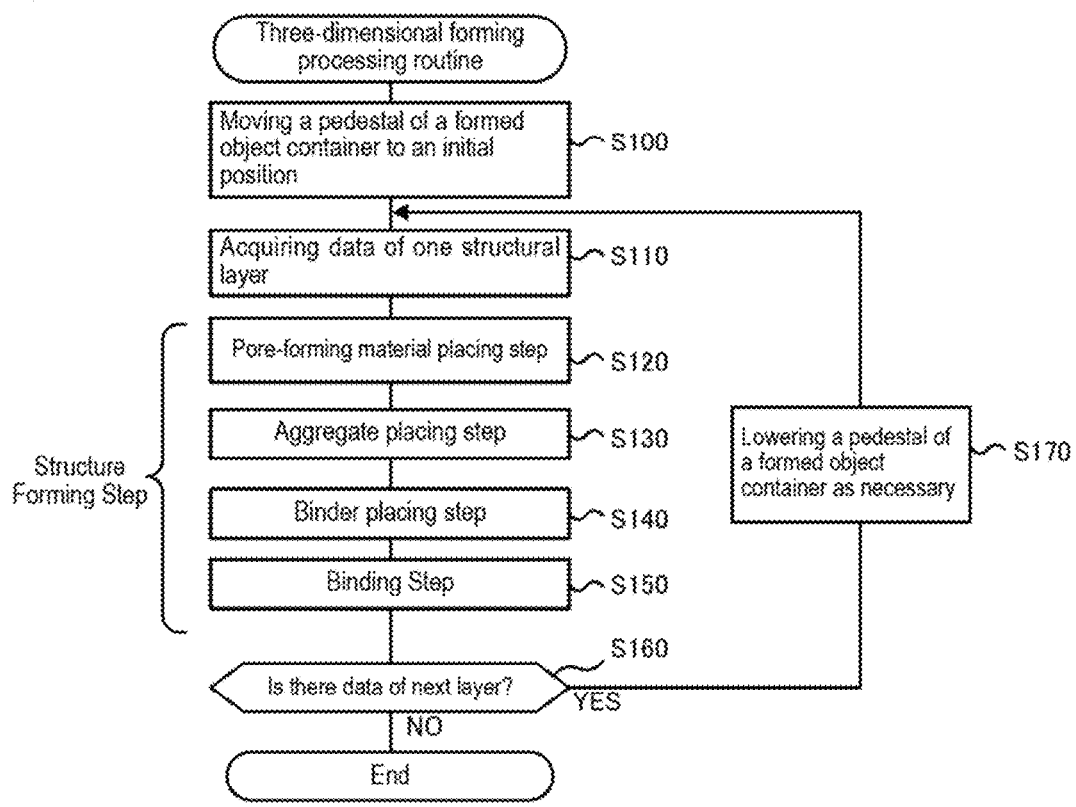
FIG. 3 is a flowchart showing an example of a three-dimensional forming processing routine.

Next, a method for manufacturing the honeycomb structure 41 using the three-dimensional forming apparatus 10 configured as described above will be described. The method for manufacturing the honeycomb structure 41 includes a structure forming step including: a pore-forming material placing step of placing the pore-forming material 50 for forming the pores 43 in the honeycomb structure 41; an aggregate placing step of placing the aggregate particles 51 that are part of the raw materials of the honeycomb structure 41; a binder placing step of placing the binder particles 52 that are part of the raw materials of the honeycomb structure 41; and a binding step of heat-fusing at least part of the placed binder particles 52 to thereby bind aggregate particles 51 together; the structure forming step being repeatedly performed a plurality of times. FIG. 3 is a flowchart showing an example of a three-dimensional forming processing routine executed by the controller 31 of the three-dimensional forming apparatus 10. FIG. 4 shows illustrations of the procedure for manufacturing a bound body 62 that is part of the partition walls 42 of the honeycomb structure 41. The program of the routine in FIG. 3 is stored in the storage unit 32 and executed when, for example, the operator inputs an execution instruction through an unillustrated operation unit of the three-dimensional forming apparatus 10.

When this routine is started, the controller 31 first moves (raises or lowers) the pedestal 16 of the formed object container 15 to an initial position (step S100). The initial position of the pedestal 16 may be prescribed in advance, for example, as the height at which the first step included in the structure forming step (step S120, i.e., the pore-forming material placing step, in the present embodiment) can be performed. In the present embodiment, the height at which the pore-forming material placing step can be performed is used as the initial position, and the initial position is prescribed as a position at which the upper surface of the pedestal 16 is flush with the upper surfaces of the walls 18 and 19 of the formed object container 15. Next, the controller 31 acquires, from the porous body data 33, data including one structural layer of the honeycomb structure 41 that is to be formed next (step S110). In the present embodiment, the three-dimensional forming apparatus 10 forms the honeycomb structure 41 in a direction along partition wall surfaces of the partition walls 42 (their surfaces exposed in the cells 44), i.e., in a direction along the left-right direction in the lower section of FIG. 1. In other words, the honeycomb structure 41 is formed such that the direction along the partition wall surfaces of the cell 44 coincides with the upward-downward direction in FIG. 2 (see the orientation of the honeycomb structure 41 in FIG. 2). The porous body data 33 may be data representing each structural layer. In step S110, the controller 31 may read the data to acquire data for one layer. Alternatively, the controller 31 may acquire data for one layer by processing the porous body data 33 to generate the data for one layer. The vertical thickness of one structural layer of the honeycomb structure 41, i.e., the number of layers of the honeycomb structure 41 that are formed separately, may be empirically determined according to the time required for the formation and the precision of the formation.

Next, the controller 31 performs the pore-forming material placing step of placing the pore-forming material 50 on the pedestal 16 of the formed object container 15 (step S120, FIG. 4(a)). In the present embodiment, the controller 31 performs the pore-forming material placing step using fused deposition modeling (FDM). Specifically, while the controller 31 instructs the head moving unit 11 to move the pore-forming material nozzle 13 in the XY directions, the pore-forming material 50 (thermoplastic resin) in molten form is extruded from the pore-forming material nozzle 13 to place the pore-forming material 50 on prescribed positions on the pedestal 16. The controller 31 controls the position of the pore-forming material nozzle 13 to thereby control the placement position of the pore-forming material 50. As shown in FIG. 4(a), the controller 31 places the pore-forming material 50 in region A in which a partition wall 42 (and pores 43) of the honeycomb structure 41 is to be formed and does not place the pore-forming material 50 in regions B that later become cells 44. Dash-dot frames in FIG. 4 are enlarged views of the upper surface of region A. The controller 31 uses the data for one layer acquired in step S110 to place the pore-forming material 50 on positions on which pores 43 in the one structural layer are to be formed. In the present embodiment, the positions on which the pore-forming material 50 is to be placed are represented in vector format in the date for one layer acquired in step S110. As shown in the dash-dot frame in FIG. 4(a), the controller 31 moves the pore-forming material nozzle 13 on the basis of the data in vector format to place the pore-forming material 50 such that the pore-forming material 50 forms the shape of a combination of a plurality of straight lines as viewed from above. The positions on which the pore-forming material 50 is to be placed may be represented in raster format. In this case, the forming head 12 is scanned in the XY directions while the pore-forming material 50 is switched between being extruded and not being extruded from the pore-forming material nozzle 13 to thereby place the pore-forming material 50. The shape of the placed pore-forming material 50 is not limited to linear, and the placed pore-forming material 50 may have a curved shape, a dotted shape, or a combination of two or more shapes. During a single execution of the pore-forming material placing step, the controller 31 may further place (stack) the pore-forming material 50 on the already placed pore-forming material 50 to increase the height of the resulting placed pore-forming material 50.

After the pore-forming material 50 is placed, the controller 31 performs the aggregate placing step for placing the aggregate particles 51 (SiC in the present embodiment) using the aggregate supply unit 21 and the squeegee moving unit 28 (step S130, FIG. 4(b)). In the aggregate placing step, the controller 31 raises the pedestal 22 to lift the aggregate particles 51 in the space in the aggregate supply unit 21 upward. The controller 31 instructs the squeegee moving unit 28 to raise or lower the squeegee 29 such that the squeegee 29 is located at a height at which its lower end comes into contact with the upper surface of the wall 18. Then the controller 31 moves the squeegee 29 to the right to move the lifted aggregate particles 51 to the right. If necessary, the controller 31 may lower the pedestal 16 by a prescribed amount before the squeegee 29 moves the aggregate particles 51 to thereby ensure a space for placing the aggregate particles 51 on the pedestal 16. By performing the aggregate placing step, the aggregate particles 51 are placed at a substantially uniform thickness in the space surrounded by the pedestal 16 and the wall sections of the formed object container 15. The controller 31 may reciprocate the squeegee 29 in the left-right direction to thereby level the upper surface of the placed aggregate particles 51. Among dash-dot-dot frames in FIG. 4, the left frames are enlarged views of cross-sections of region A, and the right frames are enlarged views of cross-sections of region B. By performing the aggregate placing step, aggregate particles 51 in region A are disposed in spaces separated by the pore-forming material 50, and only aggregate particles 51 are disposed in regions B, as shown in FIG. 4(b). Aggregate particles 51 may be disposed also on the pore-forming material 50. By performing the aggregate placing step after performing the pore-forming material placing step as described above, the pore-forming material 50 placed in advance allows the positions of the aggregate particles 51 in region A to be controlled, and porous bodies (partition walls 42) having a desired pore structure can thereby be easily formed. The diameter of the aggregate particles 51 may be empirically determined on the basis of, for example, the pore structure of the partition walls 42 to be formed, and the average particle diameter may be, for example, from 0.1 μm to 30 μm inclusive. The average particle diameter is a median diameter (D50) measured using a laser diffraction/scattering particle size distribution measurement device with water used as a dispersion medium.

After the aggregate particles 51 are placed, the controller 31 performs the binder placing step of placing the binder particles 52 (Si in the present embodiment) using the binder supply unit 25 and the squeegee moving unit 28 (step S140, FIGS. 4(c) and (d)). In the binder placing step, the controller 31 performs the same processing as in the aggregate placing step in step S130 except that the binder supply unit 25 is used instead of the aggregate supply unit 21. Specifically, the controller 31 raises the pedestal 26 to lift the binder particles 52 in the space in the binder supply unit 25 upward and then moves the squeegee 29 to the left to thereby move the lifted binder particles 52 to the left (FIG. 4(c)). If necessary, the controller 31 may lower the pedestal 16 by a prescribed amount before the squeegee 29 moves the binder particles 52 to thereby ensure a space for placing the binder particles 52 on the pedestal 16. By performing the binder placing step, the binder particles 52 are placed (scattered) substantially uniformly on the aggregate particles 51 placed in the formed object container 15, so that the aggregate particles 51 and the binder particles 52 are mixed together (FIG. 4(d)). Particles including the aggregate particles 51 and the binder particles 52 mixed together are collectively referred to as mixed particles 53. As shown in FIG. 4(d), mixed particles 53 in region A are placed in spaces separated by the pore-forming material 50, and only mixed particles 53 are placed in regions B. Binder particles 52 may be placed also on the pore-forming material 50. By performing the binder placing step after performing the pore-forming material placing step as described above, the pore-forming material 50 placed in advance allows the positions of the binder particles 52 in region A to be controlled, and porous bodies (partition walls 42) having a desired pore structure can thereby be easily formed. In the present embodiment, the diameter of the binder particles 52 is smaller than the diameter of the aggregate particles 51. However, this is not a limitation, and the diameter of the binder particles 52 may be empirically determined on the basis of, for example, the pore structure of the partition walls 42 to be formed. The average diameter of the binder particles 52 may be, for example, from 2 μm to 50 μm inclusive.

After the binder particles 52 are placed, the controller 31 performs the binding step of heat-fusing at least part of the binder particles 52 placed on the pedestal 16 to thereby bind aggregate particles 51 together (step S150, FIGS. 4(e) and (f)). In the present embodiment, the controller 31 performs the binding step using selective laser sintering (SLS). Specifically, the controller 31 instructs the head moving unit 11 to move the laser radiation unit 14 in the XY directions and, at the same time, controls whether or not the laser radiation unit 14 emits a laser beam to thereby irradiate mixed particles 53 placed on the pedestal 16 and located in region A with the laser beam from the laser radiation unit 14 (FIG.

4(*e*)). The mixed particles 53 irradiated with the laser beam are heated, and the binder particles 52 are fused and bind their surrounding aggregate particles 51 together to form a bound body 62. In the present embodiment, the bound body 62 is a fired body in which aggregate particles 51 and binder particles 52 are fired and is Si-bonded SiC. As described above, the pore-forming material 50 is a vanishing material that vanishes upon heating. In the binding step, the pore-forming material 50 is heated by the laser beam from the laser radiation unit 14 and thereby vanishes (is burnt in the present embodiment). Therefore, in region A, the pore-forming material 50 in portions irradiated with the laser beam vanishes, and pores (empty spaces) 63 are thereby formed. As described above, in the binding step, the bound body 62 is formed as a porous body having pores 63 (FIG. 4(*f*)). In the present embodiment, the laser irradiation is performed such that all the mixed particles 53 in region A form a bound body 62 and the pore-forming material 50 in region A vanishes entirely. However, it is not always necessary to irradiate all the binder particles 52 and the pore-forming material 50 in region A directly with the laser beam from the laser radiation unit 14. Some binder particles 52 may be indirectly fused through aggregate particles 51 or other binder particles 52 heated by irradiation with the laser beam. This also applies to the vanishment of the pore-forming material 50.

By performing the structure forming step including steps S120 to S150 as described above, the bound body 62 having the pores 63 as shown in FIG. 4(*f*) is formed in region A as a portion corresponding to one structural layer of the partition walls 42 with the pores 43 in the honeycomb structure 41. Regions B are portions corresponding to cells 44. In regions B, the mixed particles 53 remain placed even after the structure forming step, and no bound body 62 is formed.

After the structure forming step is performed, the controller 31 makes a determination, based on the porous body data 33, as to whether or not there is data including one structural layer of the honeycomb structure 41 that is to be formed next, i.e., whether or not the formation of the honeycomb structure 41 has been completed (step S160). If there is data for next formation, the controller 31 lowers the pedestal 16 of the formed object container 15 as needed (step S170) and then performs the processing in step S110 and subsequent steps. Specifically, the controller 31 acquires data for one structural layer to be formed next, places the pore-forming material 50 and mixed particles 53 on the bound body 62 formed on region A on the basis of the acquired data, and places mixed particles 53 on mixed particles 53 in regions B (FIG. 4(*g*)). Then the laser beam from the laser radiation unit 14 is used to form a bound body 62 having pores 63 in region A and to cause the pore-forming material 50 to vanish (FIG. 4(*h*)). The bound body 62 formed by the previous execution of the binding step and the bound body 62 formed by the current execution of the binding step may be bonded together through the binder particles 52 placed during the current execution of the binder placing step. Alternatively, the binder (formed by fusing and solidifying binder particles 52) in the bound body 62 formed by the previous execution of the binding step may be again fused by heating, and the bound body 62 formed previously and the bound body 62 formed at this time may be bound together through the fused binder. As described above, the controller 31 repeatedly performs the structure forming step to stack bound bodies 62 upward to thereby form the honeycomb structure 41 having the partition walls 42. If there is no data including a structural layer to be formed next in step S160, i.e., when the formation of the honeycomb structure 41 has been completed, the controller 31 terminates the routine.

The honeycomb structure 41 is formed by the above-described three-dimensional forming processing routine. After completion of the three-dimensional forming processing routine, the operator removes the honeycomb structure 41 from the casing 35. The mixed particles 53 remain present in regions B in the honeycomb structure 41, i.e., in spaces corresponding to the cells 44. However, since the cells 44 have open ends, these mixed particles 53 stay on the pedestal 16 after the honeycomb structure 41 is removed and are eliminated from the honeycomb structure 41. The operator may remove the aggregate particles 51 and the binder particles 52 adhering to the honeycomb structure 41 using, for example, an unillustrated air blower separate from the three-dimensional forming apparatus 10.

When the thus-obtained honeycomb structure 41 is used to manufacture the honeycomb filter 40, the following process, for example, may be performed. First, sealed portions (the outlet sealing material 48 and the inlet sealing material 49) are formed in the cells 44 such that open inlet cells 45 each having an open first end and a sealed second end and open outlet cells 46 each having a sealed first end and an open second end are disposed alternately. The outlet sealing material 48 and the inlet sealing material 49 may be the same as the material for forming the partition walls 42. In this case, a raw material slurry containing the aggregate particles 51 and the binder particles 52 is used to close openings of the cells 44 of the honeycomb structure 41, i.e., portions in which the sealed portions are to be formed. Then firing is performed to form the outlet sealing material 48 and the inlet sealing material 49 to thereby obtain the honeycomb filter 40.

Alternatively, the honeycomb filter 40 may be formed using the three-dimensional forming apparatus 10 by forming the outlet sealing material 48 and the inlet sealing material 49 at the same time as the formation of the partition walls 42 in the three-dimensional forming processing routine. For example, when the structure forming step is repeated to stack bound bodies 62 upward, the controller 31 may form bound bodies 62 serving the outlet sealing material 48 and the inlet sealing material 49 in the binding step. Specifically, in regions B, mixed particles 53 in portions in which the outlet sealing material 48 or the inlet sealing material 49 is to be formed are irradiated with the laser beam from the laser radiation unit 14 to thereby form bound bodies 62. The outlet sealing material 48 and the inlet sealing material 49 may be porous bodies or may not be porous bodies. When the outlet sealing material 48 and the inlet sealing material 49 are porous, these sealing materials may be formed in the same manner as in the formation of the bound bodies 62 serving as the partition walls 42. Specifically, in the pore-forming material placing step, the pore-forming material 50 is placed not only on region A but also on regions B at positions in which pores are to be formed to thereby form porous bound bodies. When the outlet sealing material 48 and the inlet sealing material 49 are porous bodies, their porosity and average pore diameter may be the same as those of the partition walls 42 or may be different.

Next, the correspondences between the components in the present embodiment and the components in the present invention will be clarified. The head moving unit 11, the forming head 12, and the pore-forming material nozzle 13 in the present embodiment correspond to the pore-forming material placing unit in the present invention. The aggregate supply unit 21, the squeegee moving unit 28, and the squeegee 29 correspond to the aggregate placing unit in the present invention. The binder supply unit 25, the squeegee moving unit 28, and the squeegee 29 correspond to the binder placing unit in the present invention. The head moving unit 11, the forming head 12, and the laser radiation unit 14 correspond to the binding unit in the present invention, and the controller 31 corresponds to the controller in the present invention. In the present embodiment, the actions of the three-dimensional forming apparatus 10 are described to clarify an example of the porous body manufacturing method of the present invention.

The method for manufacturing a porous body (the honeycomb structure 41) in the present embodiment described above in detail repeatedly performs placing the pore-forming material 50, placing the aggregate particles 51, placing the binder particles 52, binding the aggregate particles 51 together a plurality of times to thereby manufacture the honeycomb structure 41 which is a porous body. In this manner, the need for a die for extrusion molding can be eliminated. For example, when the honeycomb structure 41 is manufactured by mixing raw materials to prepare clay, subjecting the clay to extrusion molding using a die to obtain a compact, and firing the compact, the die corresponding to the shape of the compact is necessary. However, with the porous body manufacturing method in the present embodiment, the honeycomb structure 41 can be manufactured without using a die, so that the cost and labor for production of the die can be cut. The partition walls 42 are porous bodies and have a structure including an overhanging shape (a shape in which an object is present above an empty space). The partition walls 42 including such an overhanging shape can be relatively easily manufactured by performing the pore-forming material placing step to place the pore-forming material 50 and then removing the pore-forming material 50 at the same time as or after the binding step. By controlling the positions of the pore-forming material 50, various pore shapes can be reproduced, so that partition walls 42 having a desired pore structure can be manufactured.

In a conventional manufacturing method using extrusion molding, for example, raw materials (clay) are supplied to an extrusion molding apparatus and caused to pass through a die for a honeycomb structure to thereby manufacture the honeycomb structure. In this case, the mixed clay before it is passed through the die contains different materials uniformly mixed, so that the pore characteristics, such as the porosity and average pore diameter, of the honeycomb structure after firing of the materials and the distribution of the materials themselves are basically uniform in the structure. However, in the porous body manufacturing method in the present embodiment, the controller 31 can control the placement positions and placement amount of the pore-forming material 50 in the pore-forming material placing step on the basis of, for example, the porous body data 33 and can also control the placement amounts and mixing ratio of the aggregate particles 51 and the binder particles 52 in the aggregate placing step and the binder placing step. In this manner, the pore characteristics such as the porosity and the average pore diameter, the distribution of the materials themselves, the structure and shape of the cells, a cross-sectional shape, etc. can be freely changed in the axial direction (length direction) of the honeycomb structure and its plane direction (radial direction). Therefore, in the honeycomb structure manufactured by the porous body manufacturing method in the present embodiment, for example, the exhaust gas cleaning performance can be improved, and the amount of a catalyst using a noble metal can be reduced, so that, for example, the cost can be reduced.

In the structure forming step, the controller 31 performs the pore-forming material placing step in the structure forming step and then performs the binder placing step and the aggregate placing step, so that the positions of the aggregate particles 51 and the binder particles 52 can be controlled by the pore-forming material 50 placed previously. Therefore, partition walls 42 having a desired pore structure can be easily formed.

The pore-forming material 50 is a vanishing material that vanishes upon heating. In the binding step, the controller 31 causes the pore-forming material 50 to vanish to thereby remove it. This allows the process to be simplified as compared to the case in which the step of removing the pore-forming material 50 is performed separately from the binding step. The pore-forming material 50 is a resin and is suitable as a vanishing material. The aggregate particles 51 are silicon carbide, and the binder particles 52 are silicon. These materials are suitable for the method for manufacturing the honeycomb structure 41 in the present embodiment.

In the binding step, the controller 31 projects the laser beam onto at least one of the pore-forming material 50, the aggregate particles 51, and the binder particles 52 to thereby heat-fuse at least part of the binder particles 52 placed on the pedestal 16. The use of the laser beam allows the mixed particles 53 on the pedestal 16 to be selectively bound together. Specifically, for example, mixed particles 53 in region A are bound together while mixed particles 53 in regions B are not bound together. Therefore, a porous body having a desired shape, such as the honeycomb structure 41 having the partition walls 42 and the cells 44, can be easily manufactured.

In the structure forming step, the three-dimensional forming apparatus 10 is used to perform the pore-forming material placing step, the aggregate placing step, and the binder placing step. In the conventional manufacturing method using a die, for example, the mixing of raw materials and the extrusion molding are performed using separate apparatuses. However, in the present embodiment, the pore-forming material placing step, the aggregate placing step, and the binder placing step that are used instead of the mixing and extrusion molding can be performed in the same three-dimensional forming apparatus 10. Therefore, one three-dimensional forming apparatus 10 can be substituted for the plurality of apparatuses. In the structure forming step, the binding step is also performed in the three-dimensional forming apparatus 10. Therefore, the step corresponding to firing in the conventional manufacturing method using a die can also be performed in the three-dimensional forming apparatus 10.

The porous body manufactured by the manufacturing method in the present embodiment is the honeycomb structure 41 including the porous partition walls 42 forming the plurality of cells 44. To manufacture the above honeycomb structure 41 using the conventional manufacturing method, it is necessary to use different dies according to not only the outer shape of the honeycomb structure 41 but also the shape and number of cells 44. Therefore, it is significant to apply the present invention to the manufacturing of the honeycomb structure 41. The controller 31 repeatedly performs the structure forming step a plurality of times to form the honeycomb structure 41 in a direction along the partition wall surfaces of the partition walls 42. In this manner, the honeycomb structure 41 can be formed such that the amount of portions having an overhanging shape (a shape in which an object is present above an empty space) is small as compared, for example, to the case in which the honeycomb structure 41 is formed in a direction perpendicular to partition wall surfaces of the partition walls 42 (in the vertical direction in the lower section of FIG. 1). Particularly, when the outlet sealing material 48 and the inlet sealing material 49 are not formed using the three-dimensional forming apparatus 10, the honeycomb structure 41 can be formed with no overhanging shape present except for the pores 63 in the partition walls 42.

The present invention is not limited to the embodiment described above. It will be appreciated that the present invention can be embodied in various forms so long as they fall within the technical scope of the invention.

For example, in the embodiment described above, the controller 31 places the aggregate particles 51 and the binder particles 52 using the squeegee 29 in the aggregate placing step and the binder placing step. However, a different method may be used in at least one of the aggregate placing step and the binder placing step, so long as the aggregate particles and the binder can be placed. For example, the three-dimensional forming apparatus 10 may include a nozzle for discharging particles downward from its forward end, and the controller 31 may place the particles on the pedestal 16 by causing the particles to be discharged from the nozzle while the nozzle is moved forward, rearward, left, and right. In the embodiment described above, the particles are placed over the entire area of the pedestal 16, but this is not a limitation. In the present case, the controller 31 may place the particles on part of the pedestal 16 (at positions at which a bound body 62 (the partition walls 42) is to be formed). For example, the particles may be placed not at positions corresponding to the cells 44 and the pores 43 in one structural layer to be formed but only at positions corresponding to the partition walls 42. Specifically, the controller 31 may control the placement positions of the particles. By controlling the placement positions of the aggregate particles 51 and the binder particles 52, the pore characteristics, the distribution of the materials themselves, the structure and shape of the cells, the cross-sectional shape, etc. can be more freely changed in the axial direction (length direction) of the honeycomb structure 41 and its plane direction (radial direction). Alternatively, a recoater having a slit-shaped downward opening with its lengthwise direction along the forward-rearward direction may be used to place particles on the pedestal 16. Specifically, the controller 31 sprinkles the particles downward from the opening while the recoater is moved forward and rearward. The recoater has members disposed on the left and right sides of the opening (e.g., plate-shaped members with their lengthwise direction along the forward-rearward direction, one plate-shaped member being disposed on each side). The particles sprinkled on the pedestal 16 from the opening may be leveled using these members. In the embodiment described above, one type of material is used for the aggregate particles 51, and one type of material is used for the binder particles 52. However, this is not a limitation. A plurality of types of materials may be used for at least one of the binder and the aggregate particles. For example, the aggregate placing step may be performed a plurality of times. In this case, a different type of material selected from the plurality of types of materials may be used each time the aggregate placing step is performed, or the ratio of the plurality of types of materials may be changed. Similarly, the binder placing step may be performed a plurality of times. In this case, a different type of material selected from the plurality of types of materials may be used each time the binder placing step is performed, or the ratio of the plurality of types of materials may be changed. In this manner, the types of materials or the mixing ratio of these materials can be controlled for at least one of the binder and the aggregate particles. This allows the pore characteristics, the distribution of the materials themselves, the structure and shape of the cells, the cross-sectional shape, etc. to be more freely changed in the axial direction (length direction) of the honeycomb structure 41 and its plane direction (radial direction).

In the embodiment described above, the controller 31 performs the pore-forming material placing step, the aggregate placing step, the binder placing step, and the binding step in this order. However, these steps may be performed in a different order, or two or more steps may be performed simultaneously or in parallel, so long as a porous body can be manufactured. For example, the controller 31 may perform the binder placing step before the aggregate placing step. A mixture of the aggregate particles 51 and the binder particles 52 may be prepared in advance on at least one of the pedestal 22 of the aggregate supply unit 21 and the pedestal 26 of the binder supply unit 25, and the controller 31 may move the particle mixture using the squeegee 29 to thereby perform the aggregate placing step and the binder placing step simultaneously. The order of the steps in the structure forming step is not necessarily the same for all the repetitions of the structure forming step, and a different order may be used for the structure forming step. For example, for each of the repetitions of the structure forming step in the embodiment described above, the controller 31 performs the pore-forming material placing step and then performs the binder placing step and the aggregate placing step. However, in at least one of the repetitions of the structure forming step, the pore-forming material placing step may be first performed, and then the binder placing step and the aggregate placing step may be performed. Alternatively, for example, in some repetitions of the structure forming step, the pore-forming material placing step included in the structure forming step may not be performed. Specifically, in some repetitions of the structure forming step, at least one of the pore-forming material placing step, the aggregate placing step, the binder placing step, and the binding step may be omitted.

In the embodiment described above, the controller 31 removes the pore-forming material 50 by causing the pore-forming material 50 to vanish in the binding step, but this is not a limitation. The removing step of removing the pore-forming material 50 may be performed separately from the binding step. For example, at least one of before and after the binding step, the pore-forming material 50 may be heated by the laser beam from the laser radiation unit 14 to thereby remove the pore-forming material 50. The step of removing the pore-forming material 50 is not necessarily performed in the structure forming step. For example, the controller 31 may remove the pore-forming material 50 in the formed honeycomb structure 41 as a whole by heating when there is no data including a structural layer to be formed next in step S160. When the pore-forming material 50 is removed as a whole, the controller 31 may perform the removing step by using, for example, a heater included in the three-dimensional forming apparatus 10 to heat the interior of the casing 35, or the operator may remove the honeycomb structure 41 from the three-dimensional forming apparatus 10 and then performs the removing step using a different heating apparatus. The pore-forming material may be removed by a method other than heating. For example, after the operator removes the honeycomb structure 41 from the three-dimensional forming apparatus 10, a liquid may be used to dissolve the pore-forming material to thereby remove the pore-forming material. Examples of such a pore-forming material include water-soluble resins. When the pore-forming material is not caused to vanish in the binding step, a material that does not vanish in the binding step may be used as the pore-forming material.

In the embodiment described above, the controller 31 performs the pore-forming material placing step using a method similar to fused deposition modeling. However, any other method may be used so long as the pore-forming material forming the pores in the porous body can be placed. For example, the controller 31 may place the pore-forming material using a PolyJet method (also referred to as an ink-jet method). Specifically, in the pore-forming material placing step, the controller 31 may place a liquid pore-forming material (ultraviolet curable resin) injected from the pore-forming material nozzle 13 on the pedestal 16, and the placed pore-forming material may be cured by irradiation with ultraviolet rays from an UV light. In this case, the UV light for UV irradiation may be disposed below the forming head 12. Specific examples of the ultraviolet curable resin include epoxy-based resins and acrylic-based resins. Also in this manner, the pore-forming material can be placed, as in the embodiment described above. The ultraviolet curable resin is also a vanishing material that vanishes upon heating and therefore can be removed in the binding step, as in the embodiment described above.

In the embodiment described above, the pore-forming material 50 is a material that cures after placement, but this is not a limitation. The placed pore-forming material may be in the form of paste or in the form of particles. For example, the pore-forming material may be a paste containing starch or starch particles. Starch is also a vanishing material that vanishes upon heating and therefore can be removed in the binding step, as in the embodiment described above. When the pore-forming material is particles, a nozzle such as the pore-forming material nozzle 13 may be used to place the particles, or a recoater may be used to place the particles. When the pore-forming material is a paste or particles, it is preferable to place the aggregate particles 51 and the binder particles 52 by sprinkling them from above using a nozzle, a recoater, etc. In this case, the positions of the placed pore-forming material are unlikely to be displaced. The pore-forming material may be a material different from the aggregate particles and the binder, as in the embodiment described, or may contain at least one of the aggregate particles 51 and the binder particles 52. For example, in the binding step, the controller 31 may selectively irradiate part of region A with the laser beam such that at least one of the aggregate particles 51 and the binder particles 52 in region A partially remain in the form particles without forming a bound body 62. Among the aggregate particles 51 and the binder particles 52, particles remaining in the form of particles without forming a bound body 62 are later removed, and portions occupied by these particles form pores 43 (pores 63). Therefore, these particles can function as the pore-forming material. After the binding step, the controller 31 may remove the remaining particles using, for example, an unillustrated air blower (blower) included in the three-dimensional forming apparatus 10. Alternatively, after completion of the three-dimensional forming processing routine, the operator may remove the remaining particles using a different air blower etc. When at least one of the aggregate particles 51 and the binder particles 52 serve as the pore-forming material, the controller 31 may omit the pore-forming material placing step in step S120 and may not place the pore-forming material 50 (thermoplastic resin). When at least one of the aggregate particles 51 and the binder particles 52 serve as the pore-forming material, at least one of the aggregate placing step and the binder placing step serves also as the pore-forming material placing step.

In the embodiment described above, the pore-forming material 50 is a material that cures after placement. The pore-forming material may be a material obtained by kneading non-vanishing particles that do not vanish by heating in the binding step and a fusible vanishing material that is fusible and curable and vanishes upon heating. Examples of the non-vanishing particles include sand, ceramic particles, and particles of the same material as the material of the aggregate particles 51 (e.g., SiC). Examples of the fusible vanishing material include thermoplastic resins and UV curable resins. FIGS. 5A-5F show illustration of the procedure in the structure forming step in this modification. FIGS. 5A-5F show enlarged views of a cross section of region A (a region in which a partition wall 42 is to be formed). For example, in the pore-forming material placing step in the structure forming step in this modification, the controller 31 first places a paste-like pore-forming material 50A prepared by kneading non-vanishing particles 54 and a fusible vanishing material 55 on the pedestal 16 using the pore-forming material nozzle 13 (FIG. 5A). After the placement, the fusible vanishing material 55 cures, and the placed pore-forming material 50A is thereby fixed at the placement positions. Next, the controller 31 performs the aggregate placing step and the binder placing step in the same manner as in the embodiment described above to place the aggregate particles 51 and the binder particles 52 (FIG. 5B). Next, the controller 31 performs the binding step in the same manner as in the embodiment described above to form a bound body 62 using the laser beam from the laser radiation unit 14 (FIG. 5C). In this case, the pore-forming material 50A is heated by the laser beam from the laser radiation unit 14, and the fusible vanishing material 55 thereby vanishes, but the non-vanishing particles 54 do not vanish and remain present. Then, in the next repetition of the structure forming step, the controller 31 places the pore-forming material 50A in the pore-forming material placing step in a similar manner (FIG. 5D) and performs the aggregate placing step, the binder placing step, and the binding step (FIG. 5E). The structure forming step is repeated in this manner. After completion of the three-dimensional forming processing routine, the operator removes the remaining non-vanishing particles 54 using, for example, a separate air blower. Portions occupied by the non-vanishing particles 54 thereby form pores 63 (pores 43) (FIG. 5F). Since the pore-forming material 50A contains the fusible vanishing material 55 as described above, the pore-forming material 50A cures, and this allows its positions and the positions of the aggregate particles 51 and the binder particles 52 to be appropriately adjusted. The pore-forming material 50A contains the non-vanishing particles 54, and the non-vanishing particles 54 remain present even after the binding step, so that, in the next repetition of the structure forming step, the pore-forming material 50A can be further placed on the non-vanishing particles 54. Therefore, large pores 63 (see FIG. 5F) extending over structures formed during multiple repetitions of the structure forming step can be formed more easily than in the embodiment described above. Since the non-vanishing particles 54 remain present, pores 63 formed are prevented from being filled with the aggregate particles 51 and the binder particles 52 in the next repetition of the structure forming step. The fusible vanishing material 55 in the pore-forming material 50A may be caused to vanish (removed) in a step other than the binding step. When the fusible vanishing material 55 is caused to vanish in a step other than the binding step, the material of the non-vanishing particles 54 used may be the same as the material of the binder particles 52 (e.g., Si). Preferably, the material of the non-vanishing particles 54 is different from the material of the binder particles 52. It is preferable to use a material that is not fused by heating or a material having low wettability to the fused binder particles 52. The non-vanishing particles 54 may be coated with a material having low wettability to the fused binder particles 52. The non-vanishing particles 54 may have an average diameter sufficiently smaller (e.g., one-tenth or lower) than the average pore diameter of the pores 43. The average diameter of the non-vanishing particles 54 may be one-thousandth or more of the average pore diameter of the pores 43.

In the embodiment described above, the controller 31 places the aggregate particles 51 and the binder particles 52 and then irradiates these particles with the laser beam to heat-fuse the binder particles 52, but this is not a limitation. The controller 31 may irradiate at least one of the pore-forming material 50, the aggregate particles 51, and the binder particles 52 with the laser beam to heat-fuse at least part of the binder particles 52 placed on the pedestal 16. For example, the controller 31 may use a laser cladding method (referred to also as a laser direct deposition method) to place the aggregate particles 51 at the same time as or after heat-fusion of the binder particles 52 to thereby perform the aggregate placing step and the binding step simultaneously. FIGS. 6A-6C show illustration of the procedure in the structure forming step in the above modification. In the structure forming step in this modification, first, the controller 31 performs the pore-forming material placing step in the same manner as in the embodiment described above and then performs the binder placing step to place the pore-forming material 50 and the binder particles 52 (FIG. 6A). Next, the controller 31 uses, for example, an aggregate nozzle 71 to perform radiation of a laser beam and placement of the aggregate particles 51 substantially simultaneously to thereby perform the aggregate placing step and the binding step simultaneously (FIG. 6B). The aggregate nozzle 71 includes: a cylindrical nozzle main body 72 having a downward opening; and a laser radiation unit 73 having the same configuration as the laser radiation unit 73 and disposed inside the nozzle main body 72. In the aggregate nozzle 71, the laser radiation unit 73 can emit a laser beam downward, and the aggregate particles 51 can be discharged (sprinkled) downward from the interior of the nozzle main body 72. The controller 31 moves the aggregate nozzle 71 in the XY directions and, at the same time, controls whether or not the laser radiation unit 14 emits a laser beam and whether or not the aggregate particles 51 are discharged from the nozzle main body 72. In FIG. 6B, the manner when the aggregate nozzle 71 moves from the left to the right is shown. In this manner, the binder particles 52 heated by the laser beam are heat-fused, and the aggregate particles 51 are placed on the heat-fused binder particles 52, whereby a bound body 62 is formed (FIG. 6C). The pore-forming material 50 vanishes by the heat of the laser beam, and pores 63 are thereby formed. Even when the controller 31 performs the structure forming step in the manner described above, the honeycomb structure 41 can be manufactured without using a die for extrusion molding, as in the embodiment described above. The use of the laser beam allows the aggregate particles 51 and the binder particles 52 to be selectively bound together.

In the binding step, the controller 31 may use a method other than the laser beam to heat-fuse the binder particles 52, so long as at least part of the binder particles 52 are heat-fused to bind aggregate particles 51 together. For example, the controller 31 may use fused deposition modeling using arc discharge to place the binder at the same time as or after heat-fusion of the binder to thereby perform the binder placing step and the binding step simultaneously. FIGS. 7A-7C show illustration of the procedure in the structure forming step in the above modification. In the structure forming step in this modification, the controller 31 first performs the pore-forming material placing step and the aggregate placing step in the same manner as in the embodiment described above to place the pore-forming material 50 and the aggregate particles 51 (FIG. 7A). Next, the controller 31 uses, for example, a welding torch 81 to heat-fuse and place a binder 56 substantially simultaneously to thereby perform the binder placing step and the binding step simultaneously (FIG. 7B). The welding torch 81 includes a cylindrical nozzle 82 having a downward opening, the binder 56 (e.g., a metal such as Si) that is a wire- or rod-shaped conductor capable of being fed downward, and a contact tube 83 into which the binder 56 is inserted vertically and which is electrically connected to the binder 56. In the welding torch 81, voltage is applied between the pedestal 16 and the contact tube 83 from an unillustrated power source, and arc discharge thereby occurs at the lower end of the wire-shaped binder 56, so that the binder 56 is heat-fused. A shielding gas 84 is supplied to the interior of the nozzle 82. The shielding gas 84 is discharged downward, so that the arc is protected from the ambient atmosphere. The controller 31 moves the welding torch 81 in the XY directions and, at the same time, controls the voltage between the pedestal 16 and the contact tube 83, the supply amount of the shielding gas 84, and the feed amount of the binder 56 to thereby place the heat-fused binder 56 on the aggregate particles 51. FIG. 7B shows the manner when the welding torch 81 moves from the left to the right. In this manner, the aggregate particles 51 and the heat-fused binder 56 are bound together, and a bound body 62 is thereby formed (FIG. 7C). The pore-forming material 50 vanishes by the heat of the arc discharge, and pores 63 are thereby formed. Even when the controller 31 performs the structure forming step in the manner described above, the honeycomb structure 41 can be manufactured without using a die for extrusion molding, as in the embodiment described above. When arc discharge is used as shown in FIGS. 7A-7C, it is preferable that an object present between the pedestal 16 and the welding torch 81 (e.g., the bound body 62 already formed) is an electric conductor. Si-bonded SiC is an electric conductor and is suitable for the method using arc discharge.

Figure 8A:
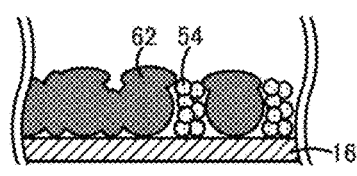
FIGS. 8A-8G show illustrations of the procedure in the structure forming step in a modification.
Figure 8B:
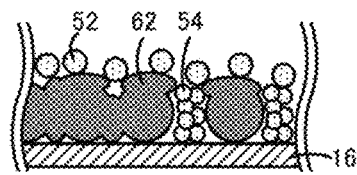
Figure 8C:
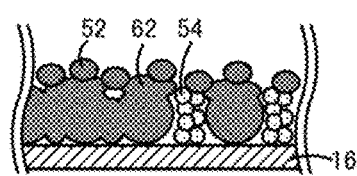
Figure 8D:
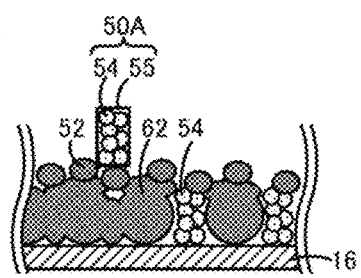
Figure 8E:
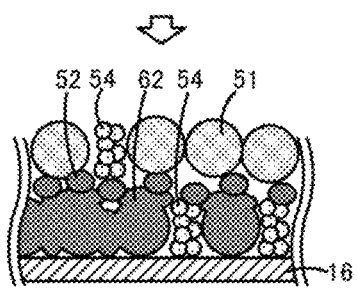
Figure 8F:
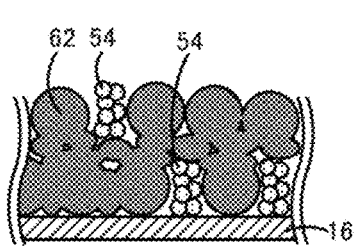
Figure 8G:
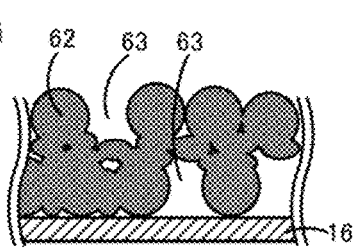

In the embodiment described above, in at least any of the second and subsequent repetitions of the structure forming step, the binder may be placed in the binder placing step so as to come into contact with at least one of the pore-forming material, the aggregate particles, and the binder heated in the binding step in the previous repetition of the structure forming step to thereby heat-fuse the placed binder. In the aggregate placing step, the aggregate particles may be placed so as to come into contact with the binder heat-fused in the binder placing step to thereby bind the aggregate particles together. FIGS. 8A-8G show illustrations of the procedure in the structure forming step in the above modification. FIG. 8A-8G show enlarged views of a cross section of region A (a region in which a partition wall 42 is to be formed). FIG. 8A is the same illustration as FIG. 5C and shows the state after the first repetition of the structure forming step is performed using the pore-forming material containing the non-vanishing particles and the fusible vanishing material. In the second repetition of the structure forming step in this modification, the controller 31 first performs the binder placing step to place the binder particles 52 (FIG. 8B). In this case, when the bound body 62 (at least one of the aggregate particles 51 and the binder particles 52) and the non-vanishing particles 54 on which the binder particles 52 are placed have high temperature as a result of the heating in the binding step in the previous (first) repetition of the structure forming step, the binder particles 52 placed are heat-fused immediately when they come into contact with the bound body 62 and the non-vanishing particles 54 (FIG. 8C). Preferably, the binder particles 52 are heat-fused to the extent that they are not fully fused and adhere to objects previously placed (the bound body 62 and the non-vanishing particles 54) while staying at the placed positions. For example, the binder placing step may be performed when the temperature of the objects (the bound body 62 and the non-vanishing particles 54) heated in the previously performed binding step reaches the temperature at which the binder particles 52 are heat-fused appropriately. In this case, the timing at which the binder placing step is performed may be determined in advance. Specifically, for example, the time from the binding step in the previous (e.g., the first) repetition of the structure forming step to the binding step in the next (e.g., the second) repetition of the structure forming step may be empirically determined. The three-dimensional forming apparatus 10 may include an unillustrated infrared thermometer within the casing 35. In this case, the controller 31 may use the infrared thermometer to detect the temperature of the objects heated in the previously performed binding step and may perform the binder placing step in the next repetition of the structure forming step when the temperature of the objects heated in the previously performed binding step reaches the appropriate temperature. The pedestal 16 or the interior of the casing 35 may be heated using, for example, an unillustrated heater to maintain the objects heated in the previously performed binding step at the appropriate temperature. After the binder placing step is performed, the controller 31 performs the pore-forming material placing step of placing the pore-forming material 50A containing the non-vanishing particles 54 and the fusible vanishing material 55 in the same manner as in FIGS. 5A and 5D above (FIG. 8D). In the pore-forming material placing step, part of the pore-forming material may vanish upon contact with at least one of the objects heated in the previously performed binding step and the binder placed in the currently performed binder placing step. For example, the fusible vanishing material 55 in FIG. 8D may vanish upon heating. Next, the controller 31 performs the aggregate placing step to place the aggregate particles 51 (FIG. 8E). In this case, when the temperature of the binder particles 52 heat-fused in the binder placing step is high enough to appropriately bind the aggregate particles 51 together, the placed aggregate particles 51 come into contact with the heat-fused binder particles 52, and the binder particles 52 and the aggregate particles 51 are bound together to form a bound body 62 (FIG. 8F). In this case, the aggregate placing step serves also as at least part of the binding step, and these two steps are performed substantially simultaneously. When the aggregate placing step serves also as the binding step as described above, the binding step using the laser radiation unit 14 in the current (e.g., the second) repetition of the structure forming step may be omitted partially or entirely. When the aggregate placing step serves also as part of the binding step, the timing at which the aggregate placing step is performed may be determined empirically or may be determined on the basis of the temperature of the binder particles 52, as in the case in which the binder particles 52 are appropriately heat-fused in the binder placing step. The binder particles 52 placed in the previously performed binder placing step may be maintained at a temperature appropriate for binding the aggregate particles 51 together by, for example, heating the binder particles 52 using a heater. The non-vanishing particles 54 remaining after the binding step (see FIG. 8F) are removed later, and pores 43 are thereby formed (FIG. 8G). The non-vanishing particles 54 may be removed, for example, after completion of the three-dimensional forming processing routine, as in the case described using FIGS. 5A-5F, or during the execution of the three-dimensional forming processing routine (e.g., after the binding step, before the next repetition of the structure forming step). By placing the binder so as to come into contact with the objects heated in the binding step in the previous repetition of the structure forming step to thereby heat-fuse the binder as described above, the heat in the previously performed binding step can be utilized. Similarly, by placing the aggregate particles so as to come into contact with the binder heat-fused in the binder placing step to thereby bind the aggregate particles together, the heat in the previously performed step can be utilized. By utilizing the heat in the previously performed step in at least one of the binder placing step and the aggregate placing step as described above, energy savings can be achieved during manufacturing of the honeycomb structure 41. In the example in FIGS. 8A-8G, the controller 31 may use, for example, a nozzle to control the placement positions of the binder particles 52 in the binder placing step. In this case, since the binder particles 52 placed are fused and adhere immediately by the heat in the previously performed step, the positions of the placed binder particles 52 are unlikely to be displaced. Therefore, the binder particles 52 can be easily placed at desired positions (e.g., the positions at which the binder particles 52 are to be placed, such as positions at which a bound body 62 (a partition wall 42) is to be formed). Also in the aggregate placing step, the controller 31 may use, for example, a nozzle to control the placement positions of the aggregate particles 51 in a similar manner. Also in this case, since the placed aggregate particles 51 are bound together immediately, the positions of the placed aggregate particles 51 are unlikely to be displaced, so that the aggregate particles 51 can be more easily placed at desired positions (positions at which the aggregate particles 51 are to be placed). In the description of the example in FIGS. 8A-8G, the pore-forming material 50A containing the non-vanishing particles 54 and the fusible vanishing material 55 is used, but the pore-forming material is not particularly limited thereto. It is only necessary that the heat in the binding step in the previous repetition of the structure forming step be utilized in at least the binder placing step and at least part of the pore-forming material do not vanish by the heat in the previously performed step and remain present. The non-vanishing particles may be used as the pore-forming material. Specifically, for example, the fusible vanishing material 55 is not used, and only the non-vanishing particles 54 are used as the pore-forming material. In the example in FIGS. 8A-8G, the binder placing step is performed, and then the pore-forming material placing step is performed, but this is not a limitation. For example, the pore-forming material placing step may be first performed, and then the binder placing step may be performed. Also in this case, when the temperature of the objects heated in the binding step in the previous repetition of the structure forming step is high during the binder placing step, this heat can be utilized to heat-fuse the binder particles 52. In the example in FIGS. 8A-8G, the aggregate particles 51 are placed in the aggregate placing step so as to come into contact with the binder particles 52 heat-fused in the binder placing step, but this is not a limitation. For example, the aggregate placing step may be performed in at least one of the state in which the binder is not heat-fused and the state in which the placed aggregate particles are not bound together. Specifically, for example, after the binder is heat-fused by utilizing the heat in the previously performed binding step and then cooled, the aggregate placing step is performed. Also in this manner, the binder can be heat-fused in the binder placing step by utilizing the heat in the previously performed step. Also the pore-forming material placing step may be performed after the binder reaches a non-heat-fused state. In this manner, even a vanishing material such as a resin can be used as the pore-forming material. Specifically, after the binder placing step, the pore-forming material placing step may be performed in a state in which the binder has a temperature at which the pore-forming material (vanishing material) does not vanish. When the aggregate placing step is performed in a state in which the placed aggregate particles are not bound immediately, the binding step may be again performed after the aggregate placing step. When the pore-forming material is a vanishing material, the pore-forming material may be caused to vanish to remove it in the binding step.

In the embodiment described above, the controller 31 instructs the head moving unit 11 to move the laser radiation unit 14 to thereby control the laser irradiation position, but this is not a limitation. For example, the laser irradiation position may be controlled by changing the orientation of a mirror for reflecting the laser beam. For example, the controller 31 may use a well-known galvanometer scanner to change the orientation of the mirror.

In the embodiment described above, the controller 31 places the mixed particles 53 on regions B that later become cells 44 but does not place the pore-forming material 50 on regions B. After completion of the three-dimensional forming processing routine, the operator removes the mixed particles 53, but this is not a limitation. For example, the controller 31 may not place the aggregate particles 51 and the binder particles 52 on regions B but may place the pore-forming material 50 on regions B. Specifically, the pore-forming material 50 may be used as a support material for forming the cells 44. In this case, after completion of the three-dimensional forming processing routine, the three-dimensional forming apparatus 10 or the operator, for example, may heat the honeycomb structure 41 to remove the pore-forming material 50.

In the embodiment described above, the controller 31 forms the honeycomb structure 41 in the direction along the partition wall surfaces of the partition walls 42 (the surfaces exposed in the cells 44), but the formation of the honeycomb structure 41 is not particularly limited thereto. For example, the honeycomb structure 41 may be formed in a direction along a direction perpendicular to the partition wall surfaces of the partition walls 42 (the vertical direction in the lower section of FIG. 1).

In the description of the above embodiment, the honeycomb structure 41 in FIG. 1 is manufactured as an example of the porous body, but this is not a limitation. A porous body having any shape may be manufactured. The materials of the aggregate and the binder are not limited to those in the embodiment described above. In the description of the above embodiment, the honeycomb structure 41 is manufactured using one three-dimensional forming apparatus 10, but this is not a particular limitation. For example, the steps in the structure forming step may be performed on a plurality of different apparatuses.

In the embodiment described above, the present invention has been described as the three-dimensional forming apparatus 10 which is a porous body manufacturing apparatus and the porous body manufacturing method, but the invention is not particularly limited thereto. For example, the present invention may be a program that is stored in the storage unit 32 and causes the three-dimensional forming apparatus 10 to execute the three-dimensional forming processing routine. The program of the present invention may be a program that causes a porous body manufacturing apparatus to repeatedly perform placing a pore-forming material, placing aggregate particles, placing a binder, and binding the aggregate particles together a plurality of times. The porous body manufacturing apparatus includes a pore-forming material placing unit for placing the pore-forming material for forming pores in the porous body, an aggregate placing unit for placing the aggregate particles which are part of raw materials of the porous body, a binder placing unit for placing the binder which is part of the raw materials of the porous body, and a binding unit for heat-fusing at least part of the binder to thereby bind aggregate particles together.

The present application claims priority from Japanese Patent Application No. 2015-179727, filed on Sep. 11, 2015, the entire contents of which are incorporated herein by reference.

What is claimed is:

1. A method for manufacturing a porous body, the method comprising
 a structure forming step repeatedly performed a plurality of times and including: a pore-forming material placing step of placing a pore-forming material for forming pores in the porous body; an aggregate placing step of placing aggregate particles which are part of raw materials of the porous body; a binder placing step of placing a binder which is part of the raw materials of the porous body; and a binding step of heat-fusing at least part of the binder to thereby bind the aggregate particles surrounding the heat-fused binder together,
 wherein the pore-forming material is a different material from the aggregate particles and the binder,
 wherein the pore-forming material is a vanishing material that vanishes upon heating, and
 wherein, in the binding step, the vanishing material is caused to vanish and is thereby removed.

2. The method for manufacturing a porous body according to claim 1,
 wherein, in the binder placing step in at least any of second and subsequent repetitions of the structure forming step, the binder is placed so as to come into contact with at least one of the pore-forming material, the aggregate particles, and the binder that have been heated in the binding step in a previous repetition of the structure forming step to thereby heat-fuse the binder placed in the binder placing step.

3. The method for manufacturing a porous body according to claim 1,
 wherein, in the binder placing step in at least any of second and subsequent repetitions of the structure forming step, the binder is placed so as to come into contact with at least one of the pore-forming material, the aggregate particles, and the binder that have been heated in the binding step in a previous repetition of the structure forming step to thereby heat-fuse the binder placed in the binder placing step, and wherein, in the aggregate placing step in the at least any of the second and subsequent repetitions of the structure forming step, the aggregate particles are placed so as to come into contact with the binder heat-fused in the binder placing step to thereby bind the aggregate particles together.

4. The method for manufacturing a porous body according to claim 1,
wherein, in at least any of the plurality of repetitions of the structure forming step, the pore-forming material placing step is performed, and then the binder placing step and the aggregate placing step are performed.

5. The method for manufacturing a porous body according to claim 1,
wherein the vanishing material is at least one of resin and starch.

6. The method for manufacturing a porous body according to claim 1, wherein the aggregate particles are silicon carbide, and the binder is silicon.

7. The method for manufacturing a porous body according to claim 1,
wherein, in the binding step, a laser beam is projected onto at least one of the pore-forming material, the aggregate particles, and the binder to thereby heat-fuse at least part of the binder placed.

8. The method for manufacturing a porous body according to claim 1,
wherein, in the structure forming step, the pore-forming material placing step, the aggregate placing step, and the binder placing step are performed using a three-dimensional forming apparatus.

9. The method for manufacturing a porous body according to claim 1,
wherein the porous body is a honeycomb structure including porous partition walls that form a plurality of cells.

10. The method for manufacturing a porous body according to claim 9,
wherein the structure forming step is repeatedly performed a plurality of times to form the honeycomb structure in a direction along partition wall surfaces of the partition walls.

* * * * *